United States Patent
Kim et al.

(10) Patent No.: US 10,082,924 B2
(45) Date of Patent: Sep. 25, 2018

(54) TOUCH SCREEN PANEL AND METHOD OF MANUFACTURING THE SAME

(71) Applicant: Samsung Display Co., Ltd., Yongin-si (KR)

(72) Inventors: Ji-Hun Kim, Hwaseong-si (KR); Hyun-Min Cho, Asan-si (KR); Yun-Jong Yeo, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 181 days.

(21) Appl. No.: 15/136,451

(22) Filed: Apr. 22, 2016

(65) Prior Publication Data

US 2017/0097707 A1    Apr. 6, 2017

(30) Foreign Application Priority Data

Oct. 2, 2015    (KR) .................. 10-2015-0139065

(51) Int. Cl.
*G06F 3/047* (2006.01)
*G06F 3/044* (2006.01)

(52) U.S. Cl.
CPC .............. *G06F 3/047* (2013.01); *G06F 3/044* (2013.01); *G06F 2203/04103* (2013.01); *G06F 2203/04111* (2013.01); *G06F 2203/04112* (2013.01)

(58) Field of Classification Search
CPC ..................................................... G06F 3/047
USPC ........................................................... 174/250
See application file for complete search history.

(56) References Cited

U.S. PATENT DOCUMENTS

| | | | | |
|---|---|---|---|---|
| 2012/0223912 A1* | 9/2012 | Kim | ................ | G06F 3/044 345/174 |
| 2013/0256008 A1* | 10/2013 | Zeng | ................ | H01H 11/00 174/257 |
| 2013/0299222 A1* | 11/2013 | Lee | ................ | G06F 3/044 174/258 |
| 2014/0054070 A1* | 2/2014 | Ichiki | ................ | G06F 3/044 174/253 |
| 2014/0174789 A1* | 6/2014 | Jiang | ................ | G06F 3/044 174/250 |
| 2015/0092359 A1* | 4/2015 | Kim | ................ | G06F 1/1643 361/748 |

FOREIGN PATENT DOCUMENTS

KR    10-2005-0015116    2/2005

* cited by examiner

*Primary Examiner* — Hoa C Nguyen
*Assistant Examiner* — Stanley Tso
(74) *Attorney, Agent, or Firm* — H.C. Park & Associates, PLC

(57) ABSTRACT

A touch screen panel including a touch electrode disposed on a base substrate, the touch electrode including a plurality of mesh patterns formed by crossing of metal wirings. The mesh patterns include a main electrode pattern and a buffer pattern overlapping the main electrode pattern, the buffer pattern having a thickness greater than 20% of a thickness of the main electrode pattern and less than 30% of a thickness of the main electrode pattern.

10 Claims, 17 Drawing Sheets

TOUCH SCREEN PANEL AND METHOD OF MANUFACTURING THE SAME

CROSS-REFERENCE TO RELATED APPLICATION

This application claims priority from and the benefit of Korean Patent Application No. 10-2015-0139065, filed on Oct. 2, 2015, which is hereby incorporated by reference for all purposes as if fully set forth herein.

BACKGROUND

Field

Exemplary embodiments relate to a touch screen panel and method of manufacturing the touch screen panel. More particularly, exemplary embodiments relate to a touch screen panel improving a display quality and a method of manufacturing the touch screen panel.

Discussion of the Background

As demands on various type of display devices have recently increased with the development of an information society, studies on display devices, such as a liquid crystal display device (LCD), a plasma display panel (PDP), a field emission display device (FED), an electrophoretic display device (EPD), and an organic light emitting display device (OLED), have been actively conducted.

Recently, studies have been conducted to apply a touch screen panel function to such display devices. A touch screen panel is an input device which enables a command to be inputted by touching a screen of a display device using an object, such as a finger or pen. Since such a touch screen panel can be substituted for a separate input device connected to a display device, such as a keyboard or mouse, its application fields have been gradually extended.

Touch screen panels are divided into a resistive overlay touch screen panel, a photosensitive touch screen panel, a capacitive touch screen panel, and the like. Among these touch screen panels, the capacitive touch screen panel converts information of a contact position into an electrical signal by sensing a change in the capacitance formed between a conductive sensing pattern and an adjacent sensing pattern, ground electrode or the like whenever an object, such as a user's hand or pen, comes in contact with the touch screen panel.

Generally, a touch screen panel includes a touch electrode formed of indium tin oxide (ITO). However, since indium is expensive, manufacturing costs may be increased.

Accordingly, a touch electrode using an opaque metal mesh pattern has been developed. The opaque metal mesh pattern has high conductivity and is less expensive than indium.

When a metal mesh pattern is used for a touch electrode, a dry-etching process may be used. However, when a metal mesh pattern is formed by the dry-etching process, defects of aluminum wiring, such as under-cut, may occur.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch screen panel having a reduced number of defects and an improved display quality.

Exemplary embodiments also provide a method of manufacturing the touch screen panel.

Additional aspects will be set forth in the detailed description which follows, and, in part, will be apparent from the disclosure, or may be learned by practice of the inventive concept.

An exemplary embodiment discloses a touch screen panel including a touch electrode disposed on a base substrate, the touch electrode including a plurality of mesh patterns formed by crossing of metal wirings. The mesh patterns include a main electrode pattern and a buffer pattern overlapping the main electrode pattern and having a thickness greater than 20% of a thickness of the main electrode pattern and less than 30% of a thickness of the main electrode pattern.

An exemplary embodiment also discloses a method of manufacturing a touch screen panel including a touch electrode disposed on a base substrate, the touch electrode including a plurality of mesh patterns formed by crossing of metal wirings. The method includes depositing a buffer layer and a main electrode layer on a base substrate, forming a photoresist pattern on the main electrode layer, etching a portion of the buffer layer and the main electrode layer by using the photoresist pattern as a mask, and etching the remaining buffer layer. A thickness of the buffer layer is greater than 20% of a thickness of the main electrode pattern and less than 30% of a thickness of the main electrode pattern.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
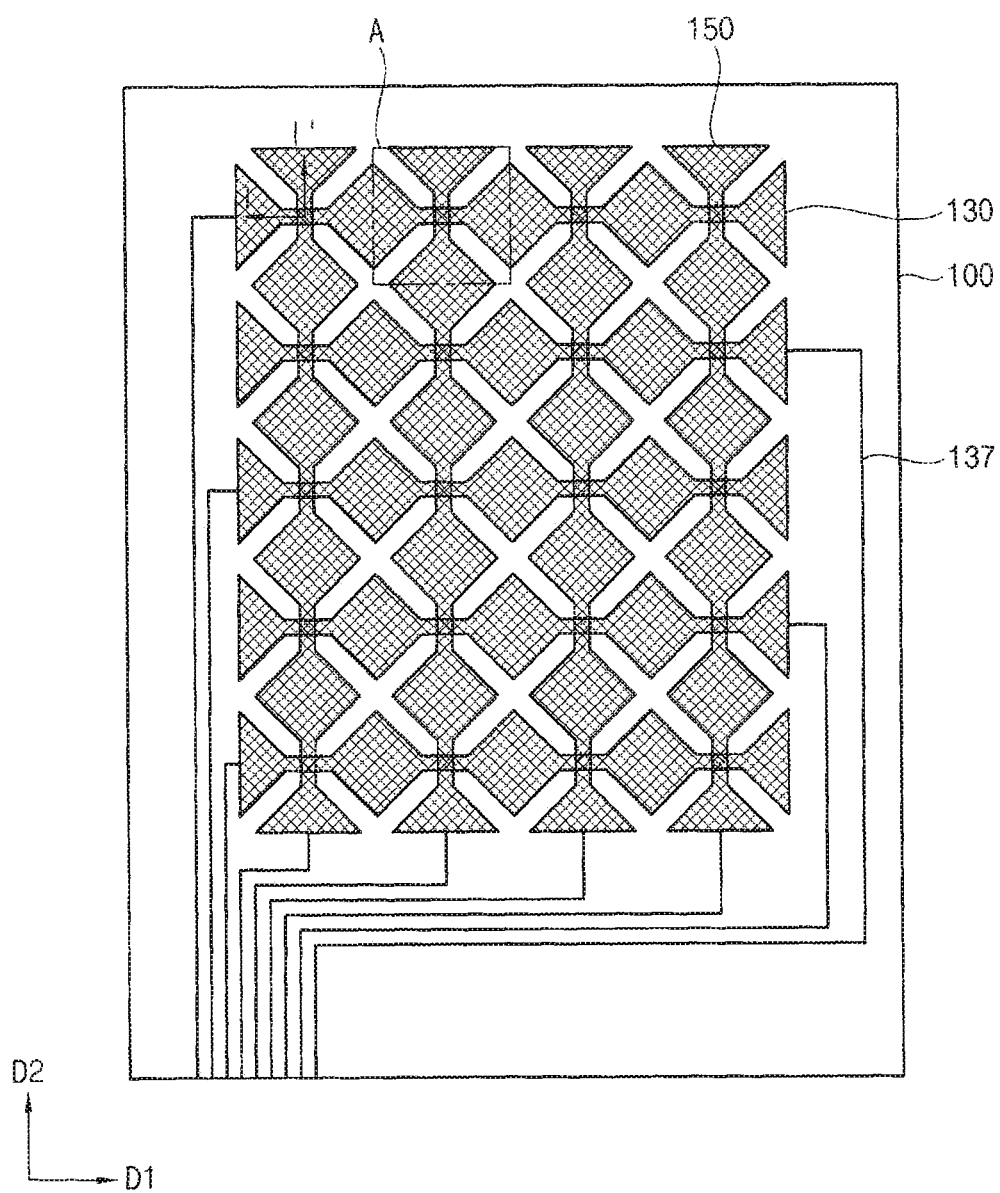
FIG. 1 is a plan view illustrating a touch screen panel according to an exemplary embodiment of the present inventive concept.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
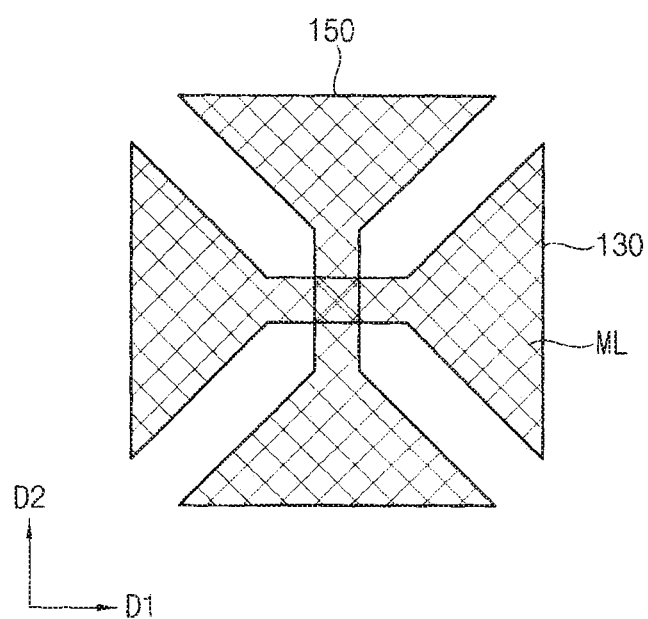
FIG. 2 is a plan view magnifying portion "A" of FIG. 1.
Figure 3:
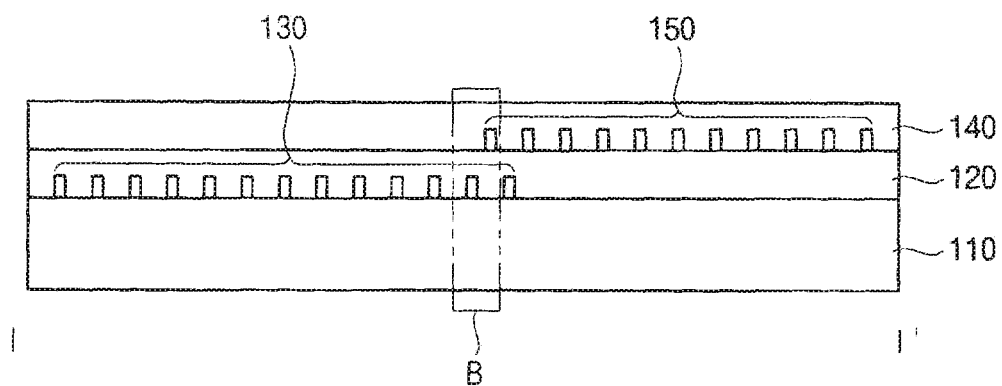
FIG. 3 is a cross-sectional view taken along a line I-I' of FIG. 1.

FIG. 1 is a plan view illustrating a touch screen panel according to an exemplary embodiment of the present inventive concept. FIG. 2 is a plan view magnifying portion "A" of FIG. 1. FIG. 3 is a cross-sectional view taken along a line I-I' of FIG. 1.

Referring to FIGS. 1 to 3, a touch screen panel 100 according to an exemplary embodiment of the present inventive concept includes a base substrate 110, a first insulation layer 120, a second insulation layer 140, a first touch electrode 130, a second touch electrode 150, and a connecting wiring 137.

The base substrate 110 may be a transparent substrate. The base substrate 110 is made of a flexible material, such as made of a material selected from a group consisting of flexible polyethylene terephthalate (PET), polycarbonate (PC), polyethylene (PE), polyvinyl chloride (PVC), polypropylene (PP), polystyrene (PS) or polymethyl methacrylate methyl ester (PMMA). Foe example, the base substrate 110 may include polycarbonate (PC), and the base substrate 110 may be a circular polarizing film having $\lambda/4$ phase difference.

The base substrate 110 may be an upper substrate which constitutes the display panel of a display device. Alternatively, the base substrate 110 may be a separate substrate attached to the display panel.

The first touch electrode 130 is disposed on the base substrate 110. The first touch electrode 130 extends in a first direction D1. The first touch electrode 130 may include a plurality of first mesh patterns formed by crossing of metal wirings ML. The first mesh patterns may have a rhombus shape. The first mesh patterns may be formed by crossing of the metal wirings ML.

The metal wirings ML of the first mesh patterns may be formed of a low-resistance metallic material. The metallic material used for the metal wirings ML may include a low-resistance metallic material, such as copper (Cu), aluminum (Al), molybdenum (Mo), titanium (Ti), silver (Ag), gold (Au), nickel (Ni), chromium (Cr), iron (Fe), indium (In), or gallium (Ga).

The first insulation layer 120 is formed on the first touch electrode 130. The first insulation layer 120 may include an inorganic material such as silicon oxide ($SiO_x$) and/or silicon nitride ($SiN_x$). For example, the first insulation layer 120 includes silicon oxide ($SiO_x$), and may have a thickness of about 500 Å. In addition, the first insulation layer 120 may include a plurality of layers including different materials from each other.

The second touch electrode 150 is disposed on the first insulation layer 120. The second touch electrode 150 extends in a second direction D2 crossing the first direction D1. The second touch electrode 150 may include a plurality of second mesh patterns formed by crossing of metal wirings ML. The second mesh patterns may have a rhombus shape. The second mesh patterns may be formed by crossing of the metal wirings ML.

The metal wirings ML of the second mesh patterns may be formed of a low-resistance metallic material. The metallic material used for the metal wirings ML may include a low-resistance metallic material, such as copper (Cu), aluminum (Al), molybdenum (Mo), titanium (Ti), silver (Ag), gold (Au), nickel (Ni), chromium (Cr), iron (Fe), indium (In), or gallium (Ga).

The second insulation layer 140 is formed on the second touch electrode 150. The second insulation layer 140 may include an inorganic material, such as silicon oxide ($SiO_x$) and/or silicon nitride ($SiN_x$). For example, the second insulation layer 140 includes silicon oxide ($SiO_x$), and may have a thickness of about 500 Å. In addition, the second insulation layer 140 may include a plurality of layers including different materials from each other.

The first and second touch electrodes 130 and 150 are alternately arranged, and include first touch electrode 130 connected to one another to form a row having the same X coordinate, and second touch electrode 150 connected to one another to form a column having the same Y coordinate. The touch screen panel 100 may be a capacitive touch screen panel in which the first touch electrode 130 and the second touch electrode 150 are alternately distributed and arranged in the active area.

The first touch electrode 130 and the second touch electrode 150 are connected to connecting wirings 137 respectively. The touch screen panel according to an exemplary embodiment of the present inventive concept is a capacitive touch screen panel. If the touch screen panel is contacted by a contact object, such as a user's finger or stylus pen, a change in capacitance, caused by a contact, is provided to the external driving circuit (not shown) through the connecting wirings 137. Then, the change in capacitance is converted into an electrical signal by an X and Y input processing circuit (not shown) or the like, so that the contact position is detected.

Figure 4:
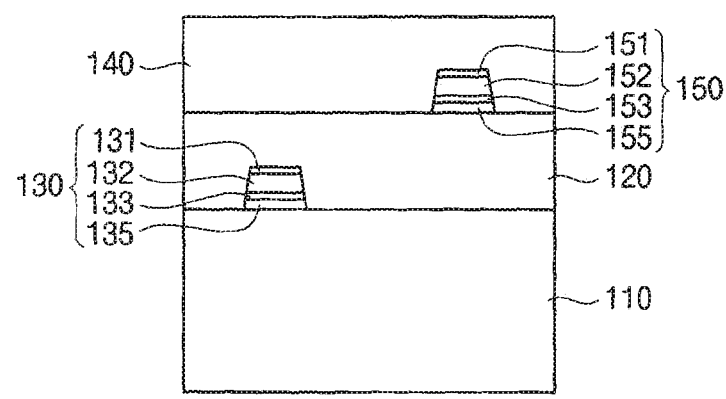
FIG. 4 is a plan view magnifying portion "B" of FIG. 3.

FIG. 4 is a plan view magnifying portion "B" of FIG. 3.

Referring to FIG. 4, a touch screen panel according to an exemplary embodiment of the present inventive concept includes a base substrate 110, a first insulation layer 120, a second insulation layer 140, a first touch electrode 130, and a second touch electrode 150.

The first touch electrode 130 is disposed on the base substrate 110. The first touch electrode 130 includes a first main electrode pattern 131, 132 and 133, and a first buffer pattern 135.

The first main electrode pattern includes a first capping metal pattern 131, a first main metal pattern 132, and a first barrier metal pattern 133.

The first capping metal pattern 131 covers the first main metal pattern 132. The first capping metal pattern 131 may include titanium (Ti) or molybdenum (Mo). The first main metal pattern 132 is disposed on the first barrier metal pattern 133. The first main metal pattern 132 may include aluminum (Al). The first barrier metal pattern 133 is disposed under the first main metal pattern 132. The first barrier metal pattern 133 may include titanium (Ti) or molybdenum (Mo). The first capping metal pattern 131 and the first barrier metal pattern 133 protect the first main metal pattern 132, and may decrease interfacial resistance between the first main metal pattern 132 and other wirings. However, the present inventive concept is not limited thereto. Alternatively, the first capping metal pattern 131 and the first barrier metal pattern 133 may be omitted.

The first buffer pattern 135 overlaps the first main electrode pattern. The first buffer pattern 135 is disposed under the first main electrode pattern only. The first buffer pattern 135 may have a thickness greater than 20% of a thickness of the first main electrode pattern and less than 30% of a thickness of the first main electrode pattern. The first buffer pattern 135 may have a thickness of 25% of a thickness of the first main electrode pattern. The first buffer pattern 135 may include silicon nitride ($Si_3N_4$).

The first insulation layer 120 is formed on the first touch electrode 130. The first insulation layer 120 may include an inorganic material such as silicon oxide ($SiO_x$) and/or silicon nitride ($SiN_x$). For example, the first insulation layer 120 includes silicon oxide ($SiO_x$), and may have a thickness of about 500 Å. In addition, the first insulation layer 120 may include a plurality of layers including different materials from each other.

The second touch electrode 150 is disposed on the first insulation layer 120. The second touch electrode 150 includes a second main electrode pattern 151, 152, and 153, and a second buffer pattern 155.

The second main electrode pattern includes a second capping metal pattern 151, a second main metal pattern 152, and a second barrier metal pattern 153.

The second capping metal pattern 151 covers the second main metal pattern 152. The second capping metal pattern 151 may include titanium (Ti) or molybdenum (Mo). The second main metal pattern 152 is disposed on the second barrier metal pattern 153. The second main metal pattern 152 may include aluminum (Al). The second barrier metal pattern 153 is disposed under the second main metal pattern 152. The second barrier metal pattern 153 may include titanium (Ti) or molybdenum (Mo). The second capping metal pattern 151 and the second barrier metal pattern 153 protect the second main metal pattern 152, and may decrease interfacial resistance between the second main metal pattern 152 and other wirings. However, the present inventive concept is not limited thereto. Alternatively, the second capping metal pattern 151 and the second barrier metal pattern 153 may be omitted.

The second buffer pattern 155 overlaps the first main electrode pattern. The second buffer pattern 155 is disposed under the first main electrode pattern only. The second buffer pattern 155 may have a thickness greater than 20% of a thickness of the second main electrode pattern, and less than 30% of a thickness of the second main electrode pattern. The second buffer pattern 155 may have a thickness of 25% of a thickness of the second main electrode pattern. The second buffer pattern 155 may include silicon nitride ($Si_3N_4$).

The second insulation layer 140 is formed on the second touch electrode 150. The second insulation layer 140 may include an inorganic material, such as silicon oxide ($SiO_x$) and/or silicon nitride ($SiN_x$). For example, the second insulation layer 140 includes silicon oxide ($SiO_x$), and may have a thickness of about 500 Å. In addition, the second insulation layer 140 may include a plurality of layers including different materials from each other.

Figure 5:
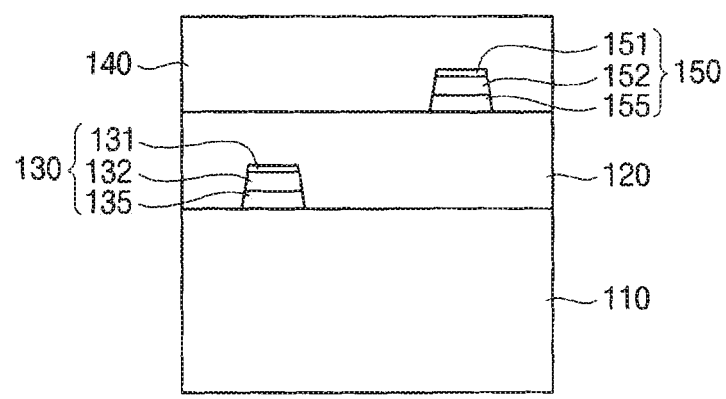
FIG. 5 is a plan view magnifying portion "B" of FIG. 3.

FIG. 5 is a plan view magnifying portion "B" of FIG. 3.

Referring to FIG. 5, a touch screen panel according to an exemplary embodiment of the present inventive concept includes a base substrate 110, a first insulation layer 120, a second insulation layer 140, a first touch electrode 130, and a second touch electrode 150.

The first touch electrode 130 is disposed on the base substrate 110. The first touch electrode 130 includes a first main electrode pattern 131 and 132, and a first buffer pattern 135.

The first main electrode pattern includes a first capping metal pattern 131 and a first main metal pattern 132.

The first capping metal pattern 131 covers the first main metal pattern 132. The first capping metal pattern 131 may include titanium (Ti) or molybdenum (Mo). The first main metal pattern 132 is disposed on the first barrier metal pattern 133. The first main metal pattern 132 may include aluminum (Al). The first capping metal pattern 131 protects the first main metal pattern 132 and may decrease interfacial resistance between the first main metal pattern 132 and other wirings. However, the present inventive concept is not limited thereto. Alternatively, the first capping metal pattern 131 may be omitted.

The first buffer pattern 135 overlaps the first main electrode pattern. The first buffer pattern 135 is disposed under the first main electrode pattern only. The first buffer pattern 135 may have a thickness greater than 20% of a thickness of the first main electrode pattern and less than 30% of a thickness of the first main electrode pattern. The first buffer pattern 135 may have a thickness of 25% of a thickness of the first main electrode pattern. The first buffer pattern 135 may include titanium (Ti) or molybdenum (Mo).

The first insulation layer 120 is formed on the first touch electrode 130. The first insulation layer 120 may include an inorganic material such as silicon oxide ($SiO_x$) and/or silicon nitride ($SiN_x$). For example, the first insulation layer 120 includes silicon oxide ($SiO_x$), and may have a thickness of about 500 Å. In addition, the first insulation layer 120 may include a plurality of layers including different materials from each other.

The second touch electrode 150 is disposed on the first insulation layer 120. The second touch electrode 150 includes a second main electrode pattern 151 and 152, and a second buffer pattern 155.

The second main electrode pattern includes a second capping metal pattern 151 and a second main metal pattern 152.

The second capping metal pattern 151 covers the second main metal pattern 152. The second capping metal pattern 151 may include titanium (Ti) or molybdenum (Mo). The second main metal pattern 152 is disposed on the second barrier metal pattern 153. The second main metal pattern 152 may include aluminum (Al). The second capping metal pattern 151 protects the second main metal pattern 152 and may decrease interfacial resistance between the second main metal pattern 152 and other wirings. However, the present inventive concept is not limited thereto. Alternatively, the second capping metal pattern 151 may be omitted.

The second buffer pattern 155 overlaps the first main electrode pattern. The second buffer pattern 155 is disposed under the first main electrode pattern only. The second buffer pattern 155 may have a thickness greater than 20% of a thickness of the second main electrode pattern and less than 30% of a thickness of the second main electrode pattern. The second buffer pattern 155 may have a thickness of 25% of a thickness of the second main electrode pattern. The second buffer pattern 155 may include silicon nitride ($Si_3N_4$).

The second insulation layer 140 is formed on the second touch electrode 150. The second insulation layer 140 may include an inorganic material, such as silicon oxide ($SiO_x$) and/or silicon nitride ($SiN_x$). For example, the second insulation layer 140 includes silicon oxide ($SiO_x$), and may have a thickness of about 500 Å. In addition, the second insulation layer 140 may include a plurality of layers including different materials from each other.

FIGS. 6 to 10 are cross-sectional views illustrating a method of manufacturing the touch screen panel of FIG. 4.

Figure 6:
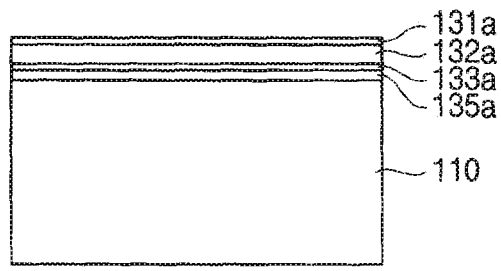
FIG. 6, FIG. 7, FIG. 8, FIG. 9, and FIG. 10 are cross-sectional views illustrating a method of manufacturing the touch screen panel of FIG. 4.

Referring to FIG. 6, a first main electrode layer 131a, a 132a, and 133a, and a first buffer layer 135a are formed on the base substrate 110.

The first main electrode layer includes a first capping metal layer 131a, a first main metal layer 132a, and a first barrier metal layer 133a.

The first capping metal layer 131a covers the first main metal layer 132a. The first capping metal layer 131a may include titanium (Ti) or molybdenum (Mo). The first main metal layer 132a is disposed on the first barrier metal layer 133a. The first main metal layer 132a may include aluminum (Al). The first barrier metal layer 133a is disposed under the first main metal layer 132a. The first barrier metal layer 133a may include titanium (Ti) or molybdenum (Mo). The first capping metal layer 131a and the first barrier metal layer 133a protect the first main metal layer 132a, and may decrease interfacial resistance between the first main metal layer 132a and other wirings. However, the present inventive concept is not limited thereto. Alternatively, the first capping metal layer 131a and the first barrier metal layer 133a may be omitted.

The first buffer layer 135a overlaps the first main electrode layer. The first buffer layer 135a is disposed under the first main electrode layer only. The first buffer layer 135a may have a thickness greater than 20% of a thickness of the first main electrode layer and less than 30% of a thickness of the first main electrode layer. The first buffer layer 135a may have a thickness of 25% of a thickness of the first main electrode layer. The first buffer layer 135a may include silicon nitride ($Si_3N_4$).

Figure 7:
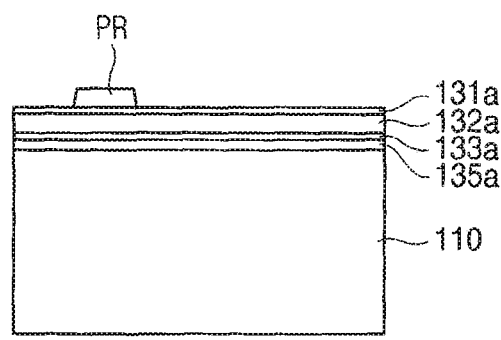

Referring to FIG. 7, a photoresist pattern PR is formed on the first main electrode layer.

A photoresist layer is formed on the first main electrode layer. The photoresist layer may include a negative type photoresist composition or a positive type photoresist composition.

When the photoresist layer includes a negative type photoresist composition, an unexposed portion of the photoresist layer is removed by a developer. The photoresist layer is exposed by using a mask to form the photoresist pattern PR.

When the photoresist layer includes a positive type photoresist composition, an exposed portion of the photoresist layer is removed by a developer. The photoresist layer is exposed by using a mask to form the photoresist pattern PR.

Figure 8:
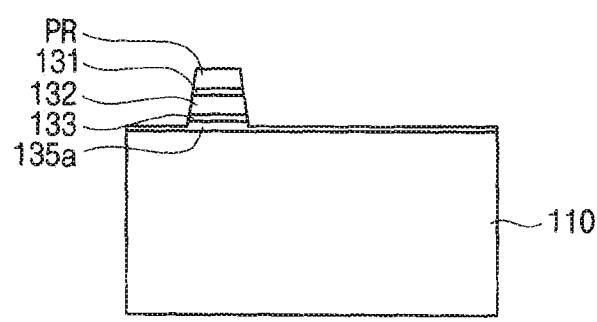

Referring to FIG. 8, a portion of the first buffer layer 135a and the first main electrode layer are etched by using the photoresist pattern PR as a mask to form a first capping metal pattern 131, a first main metal pattern 132, and a first barrier metal pattern 133.

A portion of the first buffer layer 135a and the first main electrode layer may be etched by dry-etching process. For example, a portion of the first buffer layer 135a and the first main electrode layer may be etched by dry-etch using $Cl_2$ gas or $BCl_3$ Gas.

The first main electrode layer includes a first capping metal layer 131a, a first main metal layer 132a, and a first barrier metal layer 133a. The first capping metal layer 131a, the first main metal layer 132a, and the first barrier metal layer 133a are completely etched to form a first main electrode pattern.

The first buffer layer 135a overlaps the first main electrode layer. The first buffer layer 135a is disposed under the first main electrode layer only. The first buffer layer 135a may have a thickness greater than 20% of a thickness of the first main electrode layer, and less than 30% of a thickness of the first main electrode layer. The first buffer layer 135a may have a thickness of 25% of a thickness of the first main electrode layer. A portion of the first buffer layer 135a is etched, and a portion of the first buffer layer 135a remains.

When the first main electrode layer is etched, an under-cut may occur at the first main metal pattern including aluminum (Al). However, a touch screen panel according to an exemplary embodiment of the present inventive concept includes the first buffer layer 135a. When the first main electrode layer is etched, a portion of the first buffer layer 135a is etched. Thus, an under-cut may not occur at the first main metal pattern including aluminum (Al). In order to prevent an under-cut from occurring, the first buffer layer 135a may have a thickness of more than 25% of a thickness of the first main electrode layer.

Figure 9:
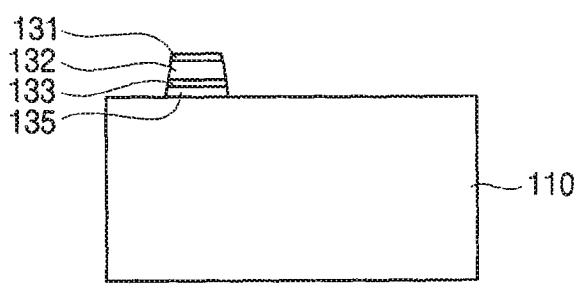

Referring to FIG. 9, the remaining first buffer layer 135a is etched to form a first buffer pattern 135.

The remaining first buffer layer 135a may be etched by a dry-etching process. The first buffer layer 135a may include silicon nitride ($Si_3N_4$). For example, the remaining first buffer layer 135a may be etched by dry-etch using $CF_4$ gas, $CHF_3$ gas, $C_2HF_5$ gas, $CH_2F_2$ gas, or $O_2$ gas.

The remaining first buffer layer 135a is etched to form a first touch electrode 130 including a first capping metal pattern 131, a first main metal pattern 132, a first barrier metal pattern 133, and a first buffer pattern 135.

Figure 10:
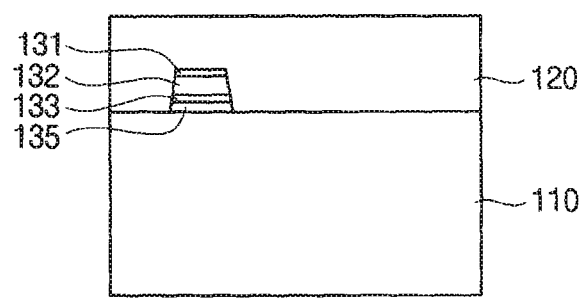

Referring to FIG. 10, the first insulation layer 120 is formed on the first touch electrode 130.

The first insulation layer 120 is formed on the first touch electrode 130. The first insulation layer 120 may include an inorganic material, such as silicon oxide ($SiO_x$) and/or silicon nitride ($SiN_x$). For example, the first insulation layer 120 includes silicon oxide ($SiO_x$), and may have a thickness of about 500 Å. In addition, the first insulation layer 120 may include a plurality of layers including different materials from each other.

Referring to FIG. 4, a second touch electrode 150 and a second insulation layer 140 are formed on the first insulation layer 120.

A method of manufacturing the second touch electrode 150 is substantially the same as the method of manufacturing the first touch electrode 130 of FIGS. 6 to 9. Thus repetitive explanation will be omitted.

The second insulation layer 140 is formed on the second touch electrode 150. The second insulation layer 140 may include an inorganic material, such as silicon oxide ($SiO_x$) and/or silicon nitride ($SiN_x$). For example, the second insulation layer 140 includes silicon oxide ($SiO_x$), and may have a thickness of about 500 Å. In addition, the second insulation layer 140 may include a plurality of layers including different materials from each other.

FIGS. 11 to 15 are cross-sectional views illustrating a method of manufacturing the touch screen panel of FIG. 5.

Figure 11:
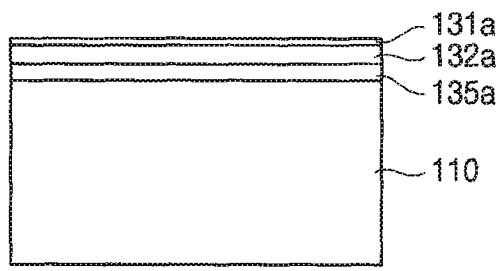
FIG. 11, FIG. 12, FIG. 13, FIG. 14, and FIG. 15 are cross-sectional views illustrating a method of manufacturing the touch screen panel of FIG. 5.

Referring to FIG. 11, a first main electrode layer 131a and 132a and a first buffer layer 135a are formed on the base substrate 110.

The first main electrode layer includes a first capping metal layer 131a and a first main metal layer 132a.

The first capping metal layer 131a covers the first main metal layer 132a. The first capping metal layer 131a may include titanium (Ti) or molybdenum (Mo). The first main metal layer 132a is disposed on the first barrier metal layer 133a. The first main metal layer 132a may include aluminum (Al). The first capping metal layer 131a protects the first main metal layer 132a and may decrease interfacial resistance between the first main metal layer 132a and other wirings. However, the present inventive concept is not limited thereto. Alternatively, the first capping metal layer 131a may be omitted.

The first buffer layer 135a overlaps the first main electrode layer. The first buffer layer 135a is disposed under the first main electrode layer only. The first buffer layer 135a may have a thickness greater than 20% of a thickness of the first main electrode layer and less than 30% of a thickness of the first main electrode layer. The first buffer layer 135a may have a thickness of 25% of a thickness of the first main electrode layer. The first buffer layer 135a may include titanium (Ti) or molybdenum (Mo).

Figure 12:
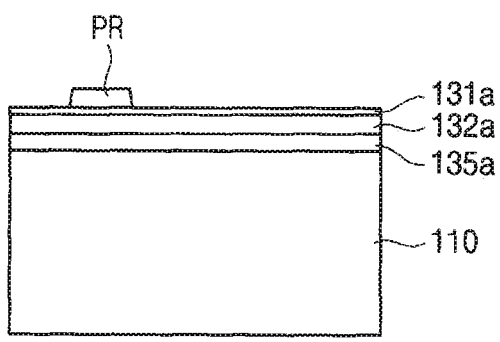

Referring to FIG. 12, a photoresist pattern PR is formed on the first main electrode layer.

A photoresist layer is formed on the first main electrode layer. The photoresist layer may include a negative type photoresist composition or a positive type photoresist composition.

When the photoresist layer includes a negative type photoresist composition, an unexposed portion of the photoresist layer is removed by a developer. The photoresist layer is exposed by using a mask to form the photoresist pattern PR.

When the photoresist layer includes a positive type photoresist composition, an exposed portion of the photoresist layer is removed by a developer. The photoresist layer is exposed by using a mask to form the photoresist pattern PR.

Figure 13:
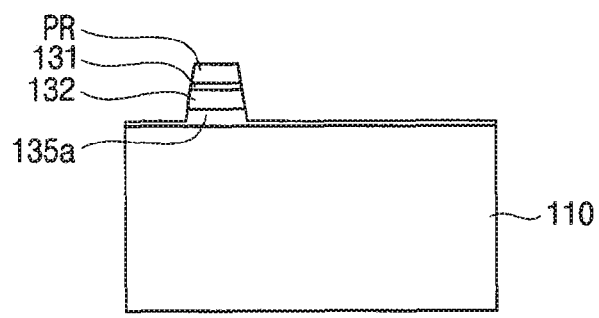

Referring to FIG. 13, a portion of the first buffer layer 135a and the first main electrode layer are etched by using the photoresist pattern PR as a mask to form a first capping metal pattern 131 and a first main metal pattern 132.

A portion of the first buffer layer 135a and the first main electrode layer may be etched by dry-etching process. For example, a portion of the first buffer layer 135a and the first main electrode layer may be etched by dry-etch using $Cl_2$ gas or $BCl_3$ Gas.

The first main electrode layer includes a first capping metal layer 131a and a first main metal layer 132a. The first capping metal layer 131a and the first main metal layer 132a are etched entirely to form a first main electrode pattern.

The first buffer layer 135a overlaps the first main electrode layer. The first buffer layer 135a is disposed under the first main electrode layer only. The first buffer layer 135a may have a thickness greater than 20% of a thickness of the first main electrode layer and less than 30% of a thickness of the first main electrode layer. The first buffer layer 135a may have a thickness of 25% of a thickness of the first main electrode layer. A portion of the first buffer layer 135a is etched and a portion of the first buffer layer 135a remains.

When the first main electrode layer is etched, an under-cut may occur at the first main metal pattern including aluminum (Al). However, a touch screen panel according to an exemplary embodiment of the present inventive concept includes the first buffer layer 135a. When the first main electrode layer is etched, a portion of the first buffer layer 135a is etched. Thus, an under-cut may not occur at the first main metal pattern including aluminum (Al). In order to prevent an under-cut from occurring, the first buffer layer 135a may have a thickness greater than 25% of a thickness of the first main electrode layer.

Figure 14:
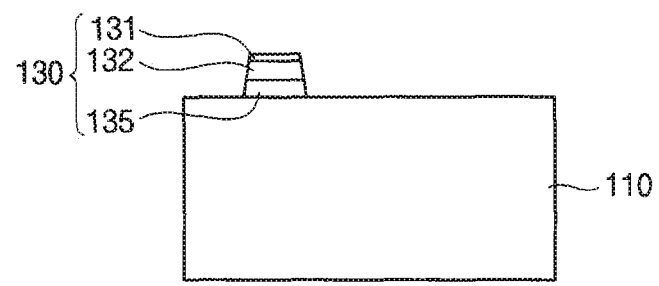

Referring to FIG. 14, the remaining first buffer layer 135a is etched to form a first buffer pattern 135.

The remaining first buffer layer 135a may be etched by dry-etching process. The first buffer layer 135a may include titanium (Ti) or molybdenum (Mo).

For example, when the remaining first buffer layer 135a includes titanium (Ti), the first buffer layer 135a may be etched by dry-etch using $CF_4$ gas, $SF_6$ gas, $NF_3$ gas, or $O_2$ gas.

In addition, when the remaining first buffer layer 135a includes molybdenum (Mo), the first buffer layer 135a may be etched by dry-etch using $CL_2$ gas or $O_2$ gas.

The remaining first buffer layer 135a is etched to form a first touch electrode 130 including a first capping metal pattern 131, a first main metal pattern 132, and a first buffer pattern 135.

Figure 15:
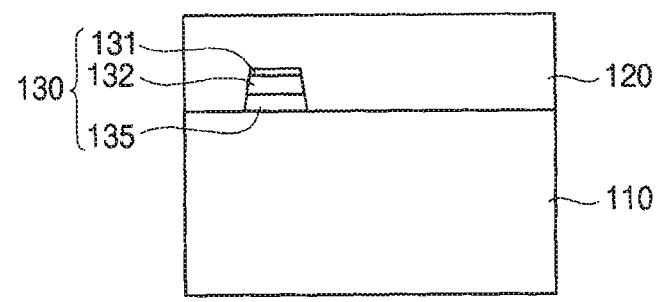

Referring to FIG. 15, the first insulation layer 120 is formed on the first touch electrode 130.

The first insulation layer 120 is formed on the first touch electrode 130. The first insulation layer 120 may include an inorganic material, such as silicon oxide ($SiO_x$) and/or silicon nitride ($SiN_x$). For example, the first insulation layer 120 includes silicon oxide ($SiO_x$), and may have a thickness of about 500 Å. In addition, the first insulation layer 120 may include a plurality of layers including different materials from each other.

Referring to FIG. 5, a second touch electrode 150 and a second insulation layer 140 are formed on the first insulation layer 120.

A method of manufacturing the second touch electrode 150 is substantially the same as the method of manufacturing the first touch electrode 130 of FIGS. 11 to 14. Thus, repetitive explanation will be omitted.

The second insulation layer 140 is formed on the second touch electrode 150. The second insulation layer 140 may include an inorganic material, such as silicon oxide ($SiO_x$) and/or silicon nitride ($SiN_x$). For example, the second insulation layer 140 includes silicon oxide ($SiO_x$), and may have a thickness of about 500 Å. In addition, the second insulation layer 140 may include a plurality of layers including different materials from each other.

Figure 16:
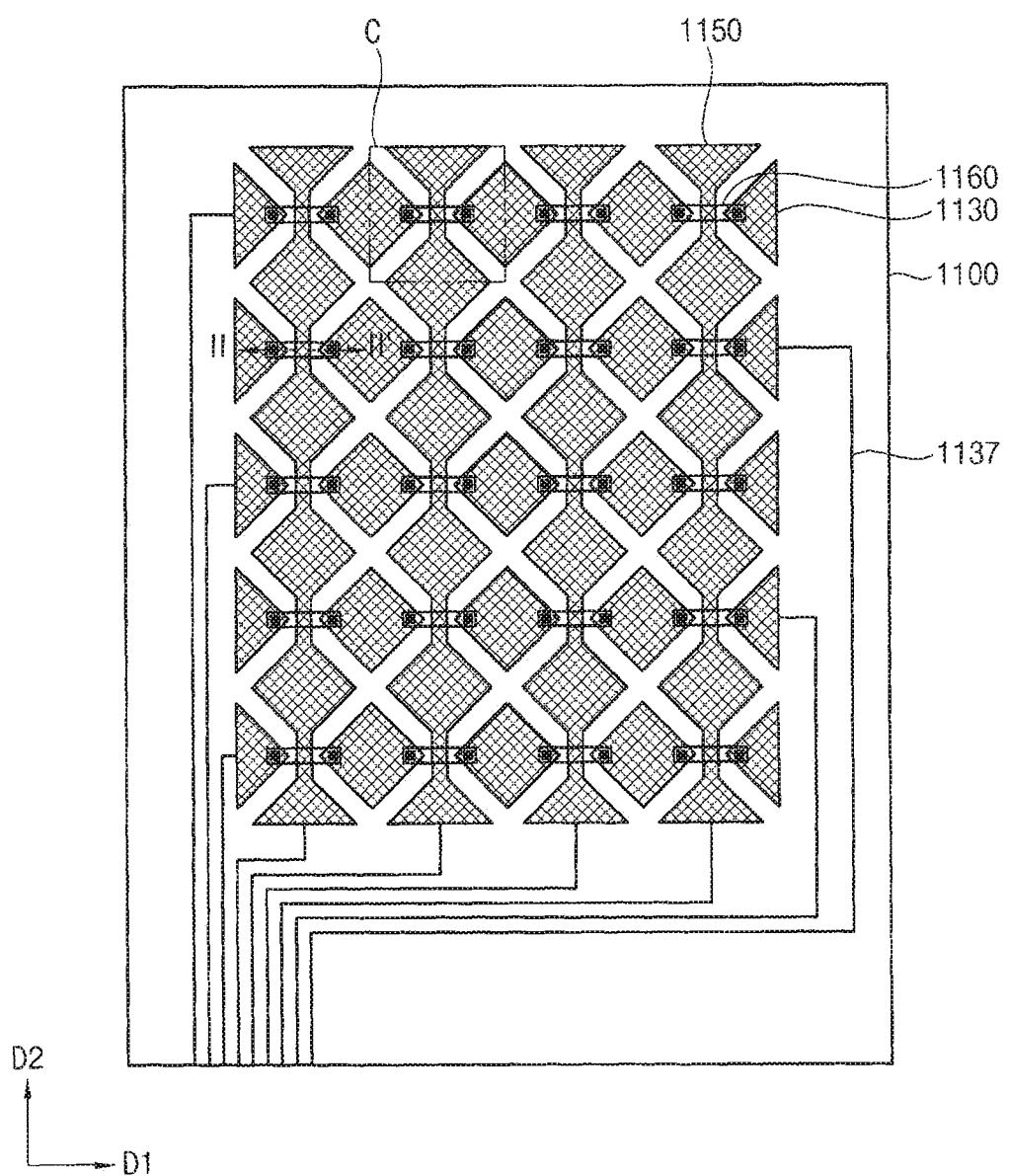
FIG. 16 is a plan view illustrating a touch screen panel according to an exemplary embodiment of the present inventive concept.
Figure 17:
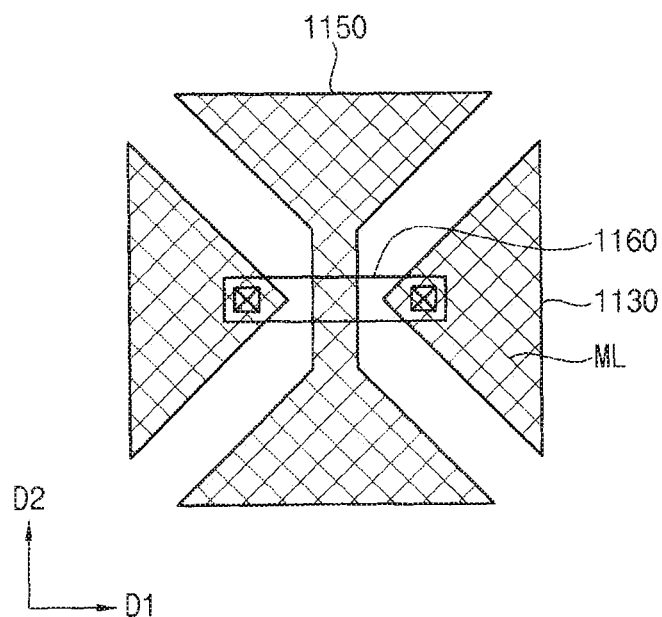
FIG. 17 is a plan view magnifying portion "C" of FIG. 16.
Figure 18:
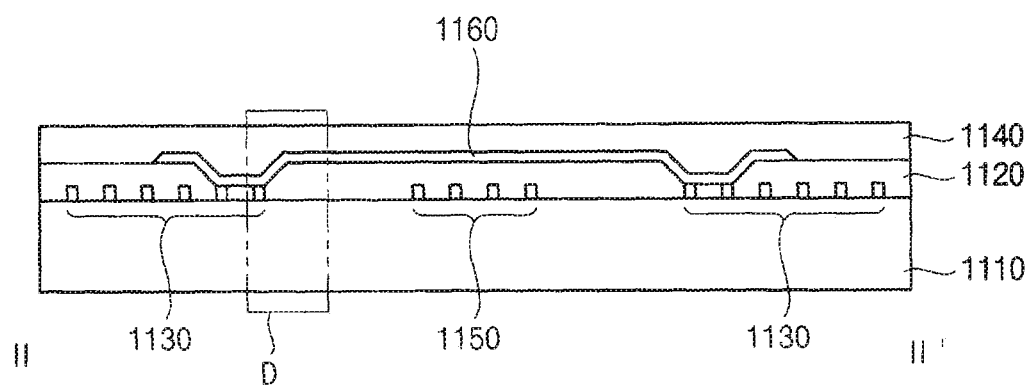
FIG. 18 is a cross-sectional view taken along a line II-II' of FIG. 16.

FIG. 16 is a plan view illustrating a touch screen panel according to an exemplary embodiment of the present inventive concept. FIG. 17 is a plan view magnifying portion "C" of FIG. 16. FIG. 18 is a cross-sectional view taken along a line II-II' of FIG. 16.

Referring to FIGS. 16 to 18, a touch screen panel 1100 according to an exemplary embodiment of the present inventive concept includes a base substrate 1110, a first insulation layer 1120, a second insulation layer 1140, a first touch electrode 1130, a second touch electrode 1150, a connecting wiring 1137, and a connecting electrode 1160.

The base substrate 1110 may be a transparent substrate. The base substrate 1110 is made of a flexible material, such as made of a material selected from a group consisting of flexible polyethylene terephthalate (PET), polycarbonate (PC), polyethylene (PE), polyvinyl chloride (PVC), polypropylene (PP), polystyrene (PS), and polymethyl methacrylate methyl ester (PMMA). Foe example, the base substrate 110 may include polycarbonate (PC) and the base substrate 1110 may a circular polarizing film having a λ/4 phase difference.

The base substrate 1110 may be an upper substrate which constitutes the display panel of a display device. Alternatively, the base substrate 1110 may be a separate substrate attached to the display panel.

The first touch electrode 1130 and the second touch electrode 1150 are disposed on the base substrate 1110. The first touch electrode 1130 is disposed on the same layer as the second touch electrode 1150.

The first touch electrode 1130 extends in a first direction D1. The first touch electrode 1130 may include a plurality of first mesh patterns formed by crossing of metal wirings ML. The first mesh patterns may have a rhombus shape. The first mesh patterns may be formed by crossing of the metal wirings ML.

The metal wirings ML of the first mesh patterns may be formed of a low-resistance metallic material. The metallic material used for the metal wirings ML may include a low-resistance metallic material, such as copper (Cu), aluminum (Al), molybdenum (Mo), titanium (Ti), silver (Ag), gold (Au), nickel (Ni), chromium (Cr), iron (Fe), indium (In), or gallium (Ga).

The second touch electrode 1150 extends in a second direction D2 crossing the first direction D1. The second touch electrode 1150 may include a plurality of second mesh patterns formed by crossing of metal wirings ML. The second mesh patterns may have a rhombus shape. The second mesh patterns may be formed by crossing of the metal wirings ML.

The metal wirings ML of the second mesh patterns may be formed of a low-resistance metallic material. The metallic material used for the metal wirings ML may include a low-resistance metallic material, such as copper (Cu), aluminum (Al), molybdenum (Mo), titanium (Ti), silver (Ag), gold (Au), nickel (Ni), chromium (Cr), iron (Fe), indium (In), or gallium (Ga).

In the present exemplary embodiment, the first mesh patterns are separated from each other and the second mesh patterns are connected with each other.

The first insulation layer 1120 is formed on the first touch electrode 1130 and the second touch electrode 1150. The first insulation layer 1120 may include an inorganic material, such as silicon oxide ($SiO_x$) and/or silicon nitride ($SiN_x$). For example, the first insulation layer 1120 includes silicon oxide ($SiO_x$), and may have a thickness of about 500 Å. In addition, the first insulation layer 1120 may include a plurality of layers including different materials from each other.

The connecting electrode 1160 is disposed on the first insulation layer 1120. The connecting electrode 1160 electrically connects the separated first mesh patterns. The connecting electrode 1160 may include a transparent conductive material, such as indium tin oxide (ITO) or indium zinc oxide (IZO). However, the present inventive concept is not limited thereto. Alternatively, the connecting electrode 1160 may include the same material as the first mesh patterns. In addition, the connecting electrode 1160 may include a low-resistance metallic material, such as copper (Cu), aluminum (Al), molybdenum (Mo), titanium (Ti), silver (Ag), gold (Au), nickel (Ni), chromium (Cr), iron (Fe), indium (In), or gallium (Ga).

The second insulation layer 1140 is formed on the connecting electrode 1160. The second insulation layer 1140 may include an inorganic material such as silicon oxide ($SiO_x$) and/or silicon nitride ($SiN_x$). For example, the second insulation layer 1140 includes silicon oxide ($SiO_x$), and may have a thickness of about 500 Å. In addition, the second insulation layer 1140 may include a plurality of layers including different materials from each other.

The first and second touch electrodes 1130 and 1150 are alternately arranged, and include first touch electrode 1130 connected to one another to form a row having the same X coordinate, and second touch electrode 1150 connected to one another to form a column having the same Y coordinate. The touch screen panel 100 may be a capacitive touch screen panel in which the first touch electrode 1130 and the second touch electrode 1150 are alternately distributed and arranged in the active area.

The first touch electrode 1130 and the second touch electrode 1150 are connected to connecting wirings 1137 respectively. The touch screen panel according to an exemplary embodiment of the present inventive concept is a capacitive touch screen panel. If the touch screen panel is contacted by a contact object, such as a user's finger or stylus pen, a change in capacitance, caused by the contact, is provided to the external driving circuit (not shown) through the connecting wirings 1137. Then, the change in capacitance is converted into an electrical signal by an X and Y input processing circuit (not shown) or the like, so that the contact position is detected.

Figure 19:
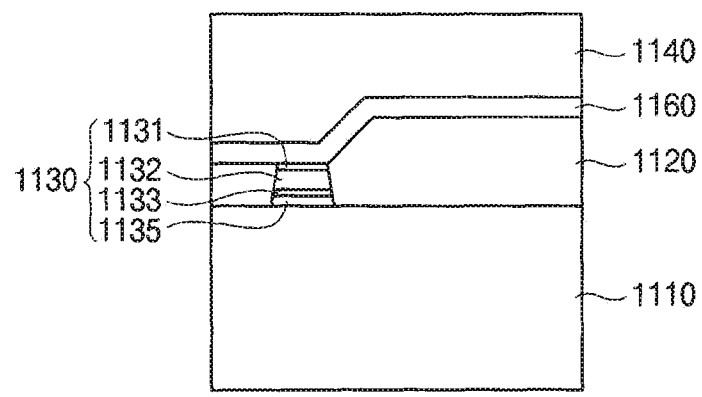
FIG. 19 is a plan view magnifying portion "D" of FIG. 18.

FIG. 19 is a plan view magnifying portion "D" of FIG. 18.

Referring to FIG. 19, a touch screen panel according to an exemplary embodiment of the present inventive concept includes a base substrate 1110, a first insulation layer 1120, a second insulation layer 1140, a first touch electrode 1130, and a connecting electrode 1160.

The first touch electrode 1130 is disposed on the base substrate 1110. The first touch electrode 1130 includes a first main electrode pattern 1131, 1132, and 1133, and a first buffer pattern 1135.

The first main electrode pattern includes a first capping metal pattern 1131, a first main metal pattern 1132, and a first barrier metal pattern 1133.

The first capping metal pattern 1131 covers the first main metal pattern 1132. The first capping metal pattern 1131 may include titanium (Ti) or molybdenum (Mo). The first main metal pattern 1132 is disposed on the first barrier metal pattern 1133. The first main metal pattern 1132 may include aluminum (Al). The first barrier metal pattern 1133 is disposed under the first main metal pattern 1132. The first barrier metal pattern 1133 may include titanium (Ti) or molybdenum (Mo). The first capping metal pattern 1131 and the first barrier metal pattern 1133 protect the first main metal pattern 1132 and may decrease interfacial resistance between the first main metal pattern 1132 and other wirings. However, the present inventive concept is not limited thereto. Alternatively, the first capping metal pattern 1131 and the first barrier metal pattern 1133 may be omitted.

The first buffer pattern 1135 overlaps the first main electrode pattern. The first buffer pattern 1135 is disposed under the first main electrode pattern only. The first buffer pattern 1135 may have a thickness greater than 20% of a thickness of the first main electrode pattern and less than 30% of a thickness of the first main electrode pattern. The first buffer pattern 1135 may have a thickness of 25% of a thickness of the first main electrode pattern. The first buffer pattern 1135 may include silicon nitride ($Si_3N_4$).

The first insulation layer 1120 is formed on the first touch electrode 1130. The first insulation layer 1120 may include an inorganic material such as silicon oxide ($SiO_x$) and/or silicon nitride ($SiN_x$). For example, the first insulation layer 1120 includes silicon oxide ($SiO_x$), and may have a thickness of about 500 Å. In addition, the first insulation layer 1120 may include a plurality of layers including different materials from each other.

The connecting electrode 1160 is disposed on the first insulation layer 1120. The connecting electrode 1160 electrically connects the separated first mesh patterns. The connecting electrode 1160 may include a transparent conductive material, such as indium tin oxide (ITO) or indium zinc oxide (IZO). However, the present inventive concept is not limited thereto. Alternatively, the connecting electrode 1160 may include the same material as the first mesh patterns. In addition, the connecting electrode 1160 may include a low-resistance metallic material, such as copper (Cu), aluminum (Al), molybdenum (Mo), titanium (Ti), silver (Ag), gold (Au), nickel (Ni), chromium (Cr), iron (Fe), indium (In), or gallium (Ga).

The second insulation layer 1140 is formed on the connecting electrode 1160. The second insulation layer 1140 may include an inorganic material, such as silicon oxide ($SiO_x$) and/or silicon nitride ($SiN_x$). For example, the second insulation layer 1140 includes silicon oxide ($SiO_x$), and may have a thickness of about 500 Å. In addition, the second insulation layer 1140 may include a plurality of layers including different materials from each other.

Figure 20:
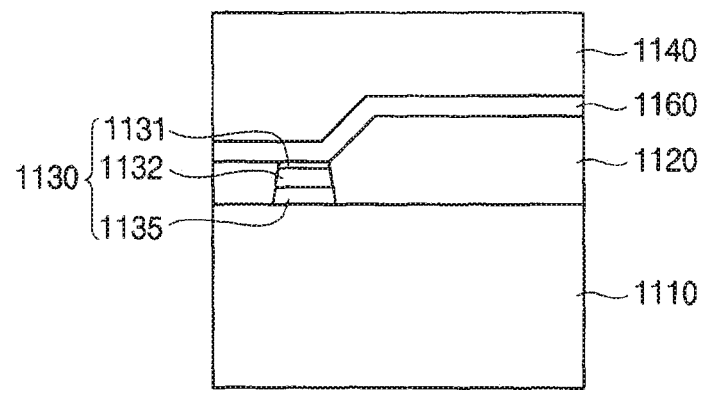
FIG. 20 is a plan view magnifying portion "D" of FIG. 18.

FIG. 20 is a plan view magnifying portion "D" of FIG. 18.

Referring to FIG. 20, a touch screen panel according to an exemplary embodiment of the present inventive concept includes a base substrate 1110, a first insulation layer 1120, a second insulation layer 1140, a first touch electrode 1130, and a connecting electrode 1160.

The first touch electrode 1130 is disposed on the base substrate 1110. The first touch electrode 1130 includes a first main electrode pattern 1131 and 1132, and a first buffer pattern 1135.

The first main electrode pattern includes a first capping metal pattern 1131 and a first main metal pattern 1132.

The first capping metal pattern 1131 covers the first main metal pattern 1132. The first capping metal pattern 1131 may include titanium (Ti) or molybdenum (Mo). The first main metal pattern 1132 is disposed on the first barrier metal pattern 1133. The first main metal pattern 1132 may include aluminum (Al). The first capping metal pattern 1131 protects the first main metal pattern 1132 and may decrease interfacial resistance between the first main metal pattern 1132 and other wirings. However, the present inventive concept is not limited thereto. Alternatively, the first capping metal pattern 1131 may be omitted.

The first buffer pattern 1135 overlaps the first main electrode pattern. The first buffer pattern 1135 is disposed under the first main electrode pattern only. The first buffer pattern 1135 may have a thickness greater than 20% of a thickness of the first main electrode pattern and less than 30% of a thickness of the first main electrode pattern. The first buffer pattern 1135 may have a thickness of 25% of a thickness of the first main electrode pattern. The first buffer pattern 1135 may include titanium (Ti) or molybdenum (Mo).

The first insulation layer 1120 is formed on the first touch electrode 1130. The first insulation layer 1120 may include an inorganic material such as silicon oxide ($SiO_x$) and/or silicon nitride ($SiN_x$). For example, the first insulation layer 1120 includes silicon oxide ($SiO_x$), and may have a thickness of about 500 Å. In addition, the first insulation layer 1120 may include a plurality of layers including different materials from each other.

The connecting electrode 1160 is disposed on the first insulation layer 1120. The connecting electrode 1160 electrically connects the separated first mesh patterns. The connecting electrode 1160 may include a transparent conductive material, such as indium tin oxide (ITO) or indium zinc oxide (IZO). However, the present inventive concept is not limited thereto. Alternatively, the connecting electrode 1160 may include the same material as the first mesh patterns. In addition, the connecting electrode 1160 may include a low-resistance metallic material, such as copper (Cu), aluminum (Al), molybdenum (Mo), titanium (Ti), silver (Ag), gold (Au), nickel (Ni), chromium (Cr), iron (Fe), indium (In), or gallium (Ga).

The second insulation layer 1140 is formed on the connecting electrode 1160. The second insulation layer 1140 may include an inorganic material, such as silicon oxide ($SiO_x$) and/or silicon nitride ($SiN_x$). For example, the second insulation layer 1140 includes silicon oxide ($SiO_x$), and may have a thickness of about 500 Å. In addition, the second insulation layer 1140 may include a plurality of layers including different materials from each other.

FIGS. 21 to 25 are cross-sectional views illustrating a method of manufacturing the touch screen panel of FIG. 19.

Figure 21:
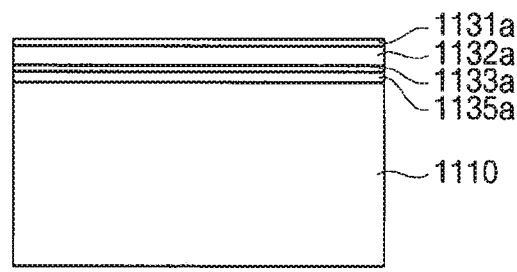
FIG. 21, FIG. 22, FIG. 23, FIG. 24, and FIG. 25 are cross-sectional views illustrating a method of manufacturing the touch screen panel of FIG. 19.

Referring to FIG. 21, a first main electrode layer 1131a, 1132a and 1133a, and a first buffer layer 1135a are formed on the base substrate 1110.

The first main electrode layer includes a first capping metal layer 1131a, a first main metal layer 1132a, and a first barrier metal layer 1133a.

The first capping metal layer 1131a covers the first main metal layer 1132a. The first capping metal layer 1131a may include titanium (Ti) or molybdenum (Mo). The first main metal layer 1132a is disposed on the first barrier metal layer 1133a. The first main metal layer 1132a may include aluminum (Al). The first barrier metal layer 1133a is disposed under the first main metal layer 1132a. The first barrier metal layer 1133a may include titanium (Ti) or molybdenum (Mo). The first capping metal layer 1131a and the first barrier metal layer 1133a protect the first main metal layer 1132a and may decrease interfacial resistance between the first main metal layer 1132a and other wirings. However, the present inventive concept is not limited thereto. Alternatively, the first capping metal layer 1131a and the first barrier metal layer 1133a may be omitted.

The first buffer layer 1135a overlaps the first main electrode layer. The first buffer layer 1135a is disposed under the first main electrode layer only. The first buffer layer 1135a may have a thickness greater than 20% of a thickness of the first main electrode layer and less than 30% of a thickness of the first main electrode layer. The first buffer layer 1135a may have a thickness of 25% of a thickness of the first main electrode layer. The first buffer layer 1135a may include silicon nitride ($Si_3N_4$).

Figure 22:
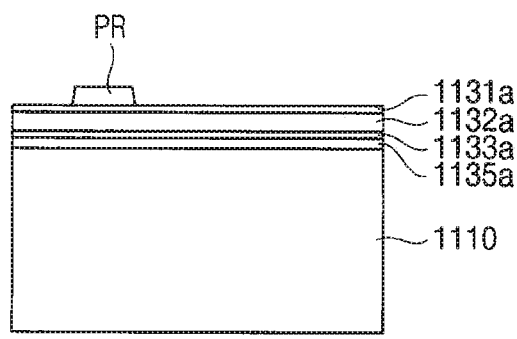

Referring to FIG. 22, a photoresist pattern PR is formed on the first main electrode layer.

A photoresist layer is formed on the first main electrode layer. The photoresist layer may include a negative type photoresist composition or a positive type photoresist composition.

When a photoresist layer includes a negative type photoresist composition, an unexposed portion of the photoresist layer is removed by a developer. The photoresist layer is exposed by using a mask to form the photoresist pattern PR.

When the photoresist layer includes a positive type photoresist composition, an exposed portion of the photoresist layer is removed by a developer. The photoresist layer is exposed by using a mask to form the photoresist pattern PR.

Figure 23:
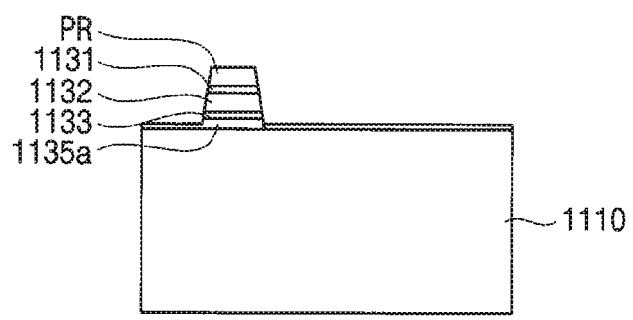

Referring to FIG. 23, a portion of the first buffer layer 1135a and the first main electrode layer are etched by using the photoresist pattern PR as a mask to form a first capping metal pattern 1131, a first main metal pattern 1132, and a first barrier metal pattern 1133.

A portion of the first buffer layer 1135a and the first main electrode layer may be etched by dry-etching process. For example, a portion of the first buffer layer 1135a and the first main electrode layer may be etched by dry-etch using $Cl_2$ gas or $BCl_3$ Gas.

The first main electrode layer includes a first capping metal layer 1131a, a first main metal layer 1132a, and a first barrier metal layer 1133a. The first capping metal layer 1131a, the first main metal layer 1132a, and the first barrier metal layer 1133a are etched entirely to form a first main electrode pattern.

The first buffer layer 1135a overlaps the first main electrode layer. The first buffer layer 1135a is disposed under the first main electrode layer only. The first buffer layer 1135a may have a thickness greater than 20% of a thickness of the first main electrode layer and less than 30% of a thickness of the first main electrode layer. The first buffer layer 1135a may have a thickness of 25% of a thickness of the first main electrode layer. A portion of the first buffer layer 1135a is etched, and a portion of the first buffer layer 1135a remains.

When the first main electrode layer is etched, an under-cut may occur at the first main metal pattern including aluminum (Al). However, a touch screen panel according to an exemplary embodiment of the present inventive concept includes the first buffer layer 1135a. When the first main electrode layer is etched, a portion of the first buffer layer 1135a is etched. Thus, an under-cut may not occur at the first main metal pattern including aluminum (Al). In order to prevent an under-cut from occurring, the first buffer layer 1135a may have a thickness greater than 25% of a thickness of the first main electrode layer.

Figure 24:
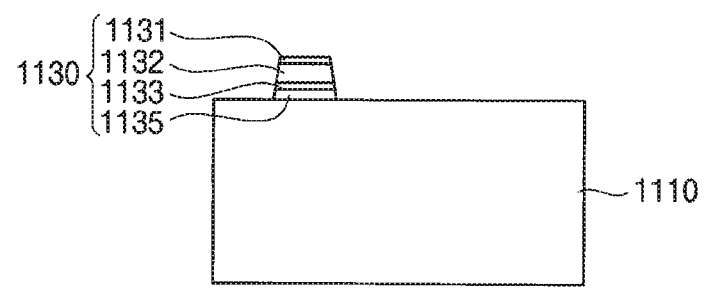

Referring to FIG. 24, a remaining first buffer layer 1135a is etched to form a first buffer pattern 1135.

The remaining first buffer layer 1135a may be etched by dry-etching process. The first buffer layer 1135a may include silicon nitride ($Si_3N_4$). For example, the remained first buffer layer 1135a may be etched by dry-etch using $CF_4$ gas, $CHF_3$ gas, $C_2HF_5$ gas, $CH_2F_2$ gas or $O_2$ gas.

The remaining first buffer layer 1135a is etched to form a first touch electrode 1130, including a first capping metal pattern 1131, a first main metal pattern 1132, a first barrier metal pattern 1133, and a first buffer pattern 1135.

Figure 25:
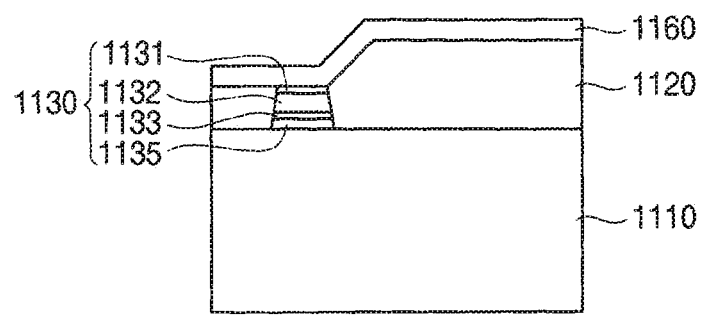

Referring to FIG. 25, the first insulation layer 1120 is formed on the first touch electrode 1130, and the connecting electrode 1160 is formed on the first insulation layer 1120.

The first insulation layer 1120 is formed on the first touch electrode. The first insulation layer 1120 may include an inorganic material, such as silicon oxide ($SiO_x$) and/or silicon nitride ($SiN_x$). For example, the first insulation layer 1120 includes silicon oxide ($SiO_x$), and may have a thickness of about 500 Å. In addition, the first insulation layer 1120 may include a plurality of layers including different materials from each other.

The connecting electrode 1160 is disposed on the first insulation layer 1120. The connecting electrode 1160 electrically connects the separated first mesh patterns. The connecting electrode 1160 may include a transparent conductive material, such as indium tin oxide (ITO) or indium zinc oxide (IZO). However, the present inventive concept is not limited thereto. Alternatively, the connecting electrode 1160 may include the same material as the first mesh patterns. In addition, the connecting electrode 1160 may include a low-resistance metallic material, such as copper (Cu), aluminum (Al), molybdenum (Mo), titanium (Ti), silver (Ag), gold (Au), nickel (Ni), chromium (Cr), iron (Fe), indium (In), or gallium (Ga).

Referring to FIG. 19, a second insulation layer 1140 is formed on the connecting electrode 1160.

The second insulation layer 1140 is formed on the connecting electrode 1160. The second insulation layer 1140 may include an inorganic material, such as silicon oxide ($SiO_x$) and/or silicon nitride ($SiN_x$). For example, the second insulation layer 1140 includes silicon oxide ($SiO_x$), and may have a thickness of about 500 Å. In addition, the second insulation layer 1140 may include a plurality of layers including different materials from each other.

FIGS. 26 to 30 are cross-sectional views illustrating a method of manufacturing the touch screen panel of FIG. 20.

Figure 26:
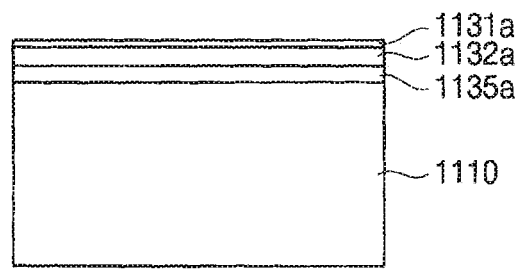
FIG. 26, FIG. 27, FIG. 28, FIG. 29, and FIG. 30 are cross-sectional views illustrating a method of manufacturing the touch screen panel of FIG. 20.

Referring to FIG. 26, a first main electrode layer 1131a and 1132a and a first buffer layer 1135a are formed on the base substrate 1110.

The first main electrode layer includes a first capping metal layer 1131a and a first main metal layer 1132a.

The first capping metal layer 1131a covers the first main metal layer 1132a. The first capping metal layer 1131a may include titanium (Ti) or molybdenum (Mo). The first main metal layer 1132a is disposed on the first barrier metal layer 1133a. The first main metal layer 1132a may include aluminum (Al). The first capping metal layer 1131a protects the first main metal layer 1132a and may decrease interfacial resistance between the first main metal layer 1132a and other wirings. However, the present inventive concept is not limited thereto. Alternatively, the first capping metal layer 1131a may be omitted.

The first buffer layer 1135a overlaps the first main electrode layer. The first buffer layer 1135a is disposed under the first main electrode layer only. The first buffer layer 1135a may have a thickness greater than 20% of a thickness of the first main electrode layer and less than 30% of a thickness of the first main electrode layer. The first buffer layer 1135a may have a thickness of 25% of a thickness of the first main electrode layer. The first buffer layer 1135a may include titanium (Ti) or molybdenum (Mo).

Figure 27:
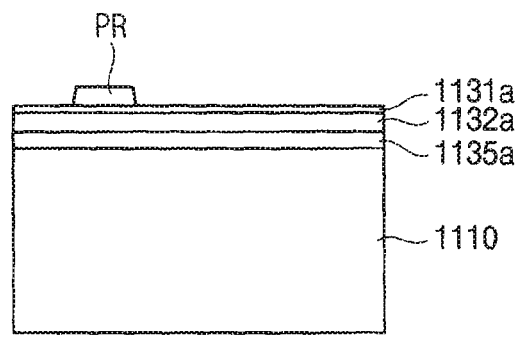

Referring to FIG. 27, a photoresist pattern PR is formed on the first main electrode layer.

A photoresist layer is formed on the first main electrode layer. The photoresist layer may include a negative type photoresist composition or a positive type photoresist composition.

When the photoresist layer includes a negative type photoresist composition, an unexposed portion of the photoresist layer is removed by a developer. The photoresist layer is exposed by using a mask to form the photoresist pattern PR.

When the photoresist layer includes a positive type photoresist composition, an exposed portion of the photoresist layer is removed by a developer. The photoresist layer is exposed by using a mask to form the photoresist pattern PR.

Figure 28:
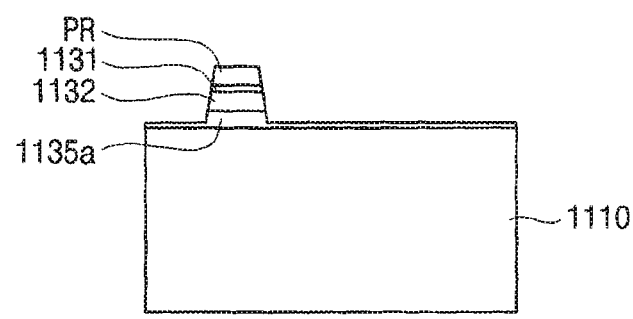

Referring to FIG. 28, a portion of the first buffer layer 1135a and the first main electrode layer are etched by using the photoresist pattern PR as a mask to form a first capping metal pattern 1131 and a first main metal pattern 1132.

A portion of the first buffer layer 1135a and the first main electrode layer may be etched by dry-etching process. For example, a portion of the first buffer layer 1135a and the first main electrode layer may be etched by dry-etch using $Cl_2$ gas or $BCl_3$ Gas.

The first main electrode layer includes a first capping metal layer 1131a and a first main metal layer 1132a. The first capping metal layer 1131a and the first main metal layer 1132a are etched entirely to form a first main electrode pattern.

The first buffer layer 1135a overlaps the first main electrode layer. The first buffer layer 1135a is disposed under the first main electrode layer only. The first buffer layer 1135a may have a thickness greater than 20% of a thickness of the first main electrode layer and less than 30% of a thickness of the first main electrode layer. The first buffer layer 1135a may have a thickness of 25% of a thickness of the first main electrode layer. A portion of the first buffer layer 1135a is etched and a portion of the first buffer layer 1135a remains.

When the first main electrode layer is etched, an under-cut may occur at the first main metal pattern including aluminum (Al). However, a touch screen panel according to an exemplary embodiment of the present inventive concept includes the first buffer layer 1135a. When the first main electrode layer is etched, a portion of the first buffer layer 1135a is etched. Thus, the under-cut may not occur at the first main metal pattern including aluminum (Al). In order to prevent an under-cut from occurring, the first buffer layer 1135a may have a thickness greater than 25% of a thickness of the first main electrode layer.

Figure 29:
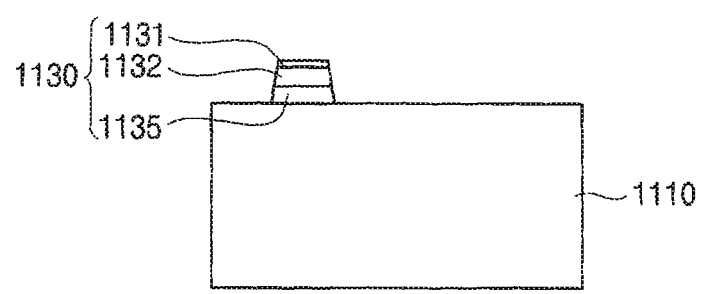

Referring to FIG. 29, a remained first buffer layer 1135a is etched to form a first buffer pattern 1135.

The remaining first buffer layer 1135a may be etched by dry-etching process. The first buffer layer 1135a may include titanium (Ti) or molybdenum (Mo).

For example, when the remaining first buffer layer 1135a includes titanium (Ti), the first buffer layer 1135a may be etched by dry-etch using $CF_4$ gas, $SF_6$ gas, $NF_3$ gas, or $O_2$ gas.

In addition, when the remaining first buffer layer 1135a includes molybdenum (Mo), the first buffer layer 1135a may be etched by dry-etch using $CL_2$ gas or $O_2$ gas.

The remaining first buffer layer 1135a is etched to form a first touch electrode 1130 including a first capping metal pattern 1131, a first main metal pattern 1132 and a first buffer pattern 1135.

Figure 30:
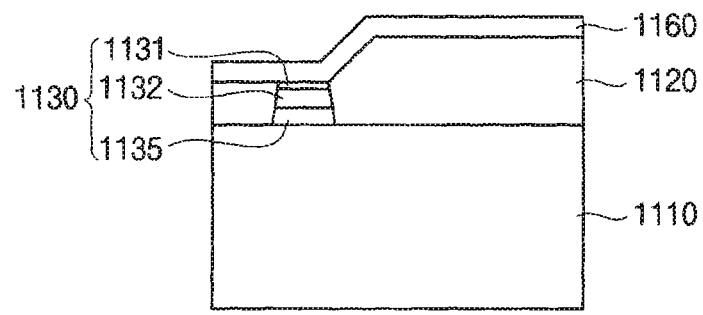

Referring to FIG. 30, the first insulation layer 1120 is formed on the first touch electrode 1130, and the connecting electrode 1160 is formed on the first insulation layer 1120.

The first insulation layer 1120 is formed on the first touch electrode. The first insulation layer 1120 may include an inorganic material, such as silicon oxide ($SiO_x$) and/or silicon nitride ($SiN_x$). For example, the first insulation layer 1120 includes silicon oxide ($SiO_x$), and may have a thickness of about 500 Å. In addition, the first insulation layer 1120 may include a plurality of layers including different materials from each other.

The connecting electrode 1160 is disposed on the first insulation layer 1120. The connecting electrode 1160 electrically connects the separated first mesh patterns. The connecting electrode 1160 may include a transparent conductive material, such as indium tin oxide (ITO) or indium zinc oxide (IZO). However, the present inventive concept is not limited thereto. Alternatively, the connecting electrode 1160 may include the same material as the first mesh patterns. In addition, the connecting electrode 1160 may include a low-resistance metallic material, such as copper (Cu), aluminum (Al), molybdenum (Mo), titanium (Ti), silver (Ag), gold (Au), nickel (Ni), chromium (Cr), iron (Fe), indium (In), or gallium (Ga).

Referring to FIG. 20, a second insulation layer 1140 is formed on the connecting electrode 1160.

The second insulation layer 1140 is formed on the connecting electrode 1160. The second insulation layer 1140 may include an inorganic material, such as silicon oxide ($SiO_x$) and/or silicon nitride ($SiN_x$). For example, the second insulation layer 1140 includes silicon oxide ($SiO_x$), and may have a thickness of about 500 Å. In addition, the second insulation layer 1140 may include a plurality of layers including different materials from each other.

According to the present exemplary embodiment, a touch electrode of a touch screen panel includes a buffer pattern disposed under a main metal pattern. The buffer pattern includes silicon nitride ($Si_3N_4$) and has a thickness greater than 20% of a thickness of the main metal pattern and less than 30% of a thickness of the main metal pattern. When the main metal pattern is etched, a portion of the buffer pattern is etched. Thus, the buffer pattern prevents over-etching of main metal pattern, so that an under-cut may not occur at the main metal pattern.

In addition, the buffer pattern is formed of the same material as the barrier metal pattern. Thus, additional process for forming an additional buffer pattern may be omitted.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch screen panel comprising a touch electrode disposed on a base substrate, the touch electrode comprising a plurality of mesh patterns formed by crossing of metal wirings,
   wherein the mesh patterns comprise:
   a main electrode pattern; and
   a buffer pattern overlapping the main electrode pattern and having a thickness greater than 20% of a thickness of the main electrode pattern and less than 30% of a thickness of the main electrode pattern.

2. The touch screen panel of claim 1, wherein the main electrode pattern comprises:
   a barrier metal pattern comprising titanium (Ti) or molybdenum (Mo);
   a main metal pattern disposed on the barrier metal pattern and comprising aluminum (Al); and
   a capping metal pattern covering the main metal pattern and comprising titanium (Ti) or molybdenum (Mo).

3. The touch screen panel of claim 2, wherein the buffer pattern comprises silicon nitride ($Si_3N_4$).

4. The touch screen panel of claim 1, wherein the main electrode pattern comprises:
   a main metal pattern disposed on the buffer pattern and comprising aluminum (Al); and
   a capping metal pattern covering the main metal pattern and comprising titanium (Ti) or molybdenum (Mo).

5. The touch screen panel of claim 4, wherein the buffer pattern comprises titanium (Ti).

6. The touch screen panel of claim 4, wherein the buffer pattern comprises molybdenum (Mo).

7. The touch screen panel of claim 1, wherein the touch electrode comprises:
   a first touch electrode extending in a first direction; and
   a second touch electrode extending in a second direction crossing the first direction.

8. The touch screen panel of claim 7, wherein the first touch electrode is disposed on a different layer from the second touch electrode.

9. The touch screen panel of claim 7, wherein the first touch electrode is disposed on the same layer as the second touch electrode.

10. The touch screen panel of claim 9, wherein:
    the first touch electrode comprises a plurality of first mesh patterns separated from each other, and the second touch electrode comprises a plurality of second mesh patterns connected with each other; and
    the touch screen panel further comprises a connecting electrode connecting the first mesh patterns.

* * * * *